United States Patent [19]

Peasley

[11] 4,036,757
[45] July 19, 1977

[54] BACKFLUSH FILTER SYSTEM

[76] Inventor: Howard P. Peasley, 7923 Chowning Road, Richmond, Va. 23229

[21] Appl. No.: 711,763

[22] Filed: Aug. 4, 1976

[51] Int. Cl.² .................. B01D 23/24; B01D 29/08
[52] U.S. Cl. .................... 210/196; 210/264; 210/274; 210/279; 210/323 T
[58] Field of Search .......... 210/62, 80, 82, 138, 210/151, 198 R, 264, 274, 275, 279, 323 R, 323 T, 196, 150

[56] References Cited

U.S. PATENT DOCUMENTS

| 364,934 | 6/1887 | Hyatt | 210/323 R |
|---|---|---|---|
| 1,312,041 | 8/1919 | Morison | 210/323 R |
| 2,541,799 | 2/1951 | White | 210/62 X |
| 2,559,784 | 7/1951 | Moore | 210/274 X |
| 3,547,270 | 12/1970 | Kass | 210/264 |
| 3,681,236 | 8/1972 | Bergles et al. | 210/62 X |
| 3,709,364 | 1/1973 | Savage | 210/80 X |
| 3,713,543 | 1/1973 | Heaney | 210/80 X |
| 3,741,390 | 6/1973 | Wallace et al. | 210/274 X |
| 3,841,999 | 10/1974 | Bennett et al. | 210/17 |
| 3,966,608 | 6/1976 | Mason et al. | 210/151 |

Primary Examiner—Thomas G. Wyse
Assistant Examiner—Robert H. Spitzer
Attorney, Agent, or Firm—Dowell & Dowell

[57] ABSTRACT

A filter system to follow a primary sewage treatment unit delivering substantially clarified effluent, the filter system having plural vertical filter columns nearly filled with filter aggregate and each column having a vertical stand pipe terminating near the bottom of the column and operative to introduce air to bubble up through the aggregate while the column is having water backflushed through it, and the filter system having a separate path by which backflushed water with the solids entrained therein is returned to the primary treatment unit during backflush purge cycles.

9 Claims, 4 Drawing Figures

BACKFLUSH FILTER SYSTEM

FIELD OF INVENTION

This invention relates to waste water treatment systems, and more particularly, relates to an improved filter system following a chlorinator, which filter system can be backflushed to clean the filter beds and remove solids in a particularly efficient manner.

BACKGROUND OF INVENTION

Systems for treating waste water, such as sewage and/or industrial waste, often include primary and secondary treatment means, the primary means usually comprising a treatment step which is aimed at separating solid materials and removing the great bulk thereof from the waste waters. This step is often followed by secondary treatment means in which the waste water is further treated to achieve a substantially clarified effluent which resembles clear water, but which is still not sufficiently treated that it can be lawfully discharged into rivers and streams, or onto the surface of the earth. Although the various jurisdictions have different requirements with respect to sufficiency of treatment of the waste water before it can be discharged, most of them require some further treatment of the effluent beyond the above mentioned secondary clarification step. The primary and secondary treatment means, hereinafter referred to as the main treatment means, can employ activated bacteria in the presence of a degree of aeration sufficient to support the bacteria. This sort of main treatment can be achieved using systems of the type disclosed for instance in the copending patent application of Peasley and McKinney, Ser. No. 579,176, filed May 20, 1975, now U.S. Pat. No. 3,984,322, and entitled SEWAGE TREATMENT APPARATUS, and as disclosed in the copending application of Peasley, Serial No. 641,867, filed Dec. 17, 1975, and entitled APPARATUS FOR TREATING SEWAGE. Systems for the further treatment of clarified waste water before it can be dumped are frequently referred to as tertiary systems, and it is to improvements in this type of system that the present invention relates.

THE INVENTION

The present invention provides an improved filtering and chlorinating system intended to be coupled to receive the effluent from a main treatment unit which may comprise primary and secondary treatment steps resulting in the discharge of an effluent which is substantially clarified, but not sufficiently free of bacteria that it can be lawfully dumped. The present system has an inlet which passes the clarified water from the main treatment system through chlorinator means, the precise construction of which is not part of the present invention. Such a chlorinator is usually in the form of a chamber filled with chlorine discharging crystals, and the clarified water is passed through and around these crystals as it flows through the chlorinator, whereby a certain amount of chlorine is dissolved in the clarified inlet water. According to the present invention, the water thus chlorinated then passes through a number of vertical columns containing filter aggregate, such as sand, pebbles, or other common filtering medium, and then the chlorinated water passes outwardly into a chlorine contact holding tank where it is held for a period of time before being dumped into a river or stream, or upon the earth, etc. The present system further includes a source of compressed air and a purge cycle timer which is operative periodically to backflush compressed air, and also water from the chlorine contact holding tank, upwardly through the columns of aggregate in order to flush the solid matter from the filter beds. The structure of the filter is such that a separate backflush path is provided by which the solid matter which is backflushed from the aggregate in the filter beds is pumped directly back into the main treatment unit, whereby the waste material is not merely allowed to settle again into the same filter bed.

OBJECTS OF THE INVENTION

It is a principal object of this invention to provide an improved filter system following chlorinator means, the filter system comprising a number of vertical columns which are preferably high in comparison with their diameters, and which contain filter aggregate through which the liquid to be filtered passes in the downward direction, each of these vertical filter columns having a vertical stand pipe opening into the aggregate virtually at the bottom of the filter bed, the stand pipe being symmetrically located with respect to the column which confines the aggregate material in the vicinity of the stand pipe for better backflushing. The stand pipe is operative during each purge cycle to force compressed air into the bottom of the confined filter aggregate column during backflushing of the system whereby substantially all of the aggregate is backflushed with compressed air.

It is another important object of this invention to provide a filter system wherein filtered water from the chlorine contact holding tank is backflushed during purging through the filter columns at the same time that compressed air is introduced near the bottoms of these columns by the stand pipes, whereby virtually the full height of each filter column is simultaneously backflushed both with filtered water and with compressed air. The confinement of the aggregate into tall columns, each having its own stand pipe insures that substantially all of the aggregate in the column will be backflushed. This represents a substantial improvement over ordinary backflushing techniques in which water and/or compressed air are generally introduced below a massive bed of aggregate, the backflushing fluids being left to follow paths of least resistance upwardly through the filter bed, whereby areas of the bed which need backflushing the least experience the greatest flow of backflushing fluids.

It is another important object of this invention to provide a partial restriction to the flow of air inside of each stand pipe, these restrictions being all located within the respective stand pipes at a level above that to which water ever rises in the stand pipes, whereby the restrictions do not become clogged by materials carried in the water. These restrictions are made small in comparison with the internal diameter of the stand pipe, and in comparison with the diameters of the filter columns, whereby the rate at which air flows through each of the stand pipes during backflushing is dependent primarily upon the diameter of the restriction, rather than the air flow being divided inversely to the degrees of clogging within the filter columns themseleves. As a result, the amount of air backflushed through each filter column is substantially the same as the amount of air backflushed through neighboring filter columns.

It is another object of this invention to provide a filter comprising a series of high narrow filter columns, each of which is backflushed both with filtered water and also with compressed air introduced in the vicinity of the bottom of the column, the air producing with the filtered water an air-lift pump effect which not only backflushes the solid matter from the aggregate, but also rapidly raises it upwardly. At the same time, the air aerates the filter aggregate and growth thereon in a manner designed to treat the latter and make it more efficient as a filtering medium.

It is still another object of this invention to provide a filter and backflush system wherein during the purge cycle an electrical timer closes a valve to prevent dumping of the treated water from the chlorine contact holding tank, and opens another valve admitting air under pressure not only into the stand pipes within the filter columns but also into the chlorine contact holding tank, thereby to drive the filtered water from the tank back through the filter columns while the compressed air is simultaneously bubbling upwardly through the columns from the stand pipes.

In the illustrative embodiment of the present invention, the timer also energizes a pump which pumps the backflushed water containing solid matter from the filters back into the main treatment unit, whereby the solid matter is removed from the filter system altogether.

A further object of the invention is to provide an improved structure for the filter itself which comprises a plurality of vertical filter columns extending between a lower header, which drains into the chlorine contact tank, and an upper header which is connected to receive clarified water from the main treatment unit through the chlorinator. The filter structure itself also includes one or more backflush receiving tubes which are vertical and which extend from the upper header downwardly to a pump which discharges into the main treatment unit. The effluent from the main treatment tank passes through the chlorinator, enters the upper header of the filter, and normally flows downwardly through the multiple vertical filter columns but not through the backflush receiving tubes which are separated from the portion of the header from which the filter tubes extend by a small weir. The top of the weir is located at a level lower than the main inlet from the chlorinator to the upper header, whereby when the filter columns are backflushed and the level of water rises in the upper header, the water and solid matter will exit from the header by overflowing the weir into the backflush tubes, rather than by attempting to flow upstream in the system from the filter into the chlorinator.

It is an advantage that in the present system the filter bed follows the chlorinator, thereby providing large surface areas in the aggregate for promoting intimate contact between the chlorine and matter in the water which is being chlorinated and filtered.

Other objects and advantages will become apparent during the following discussions of the drawings, wherein:

THE DRAWINGS

Figure 1:
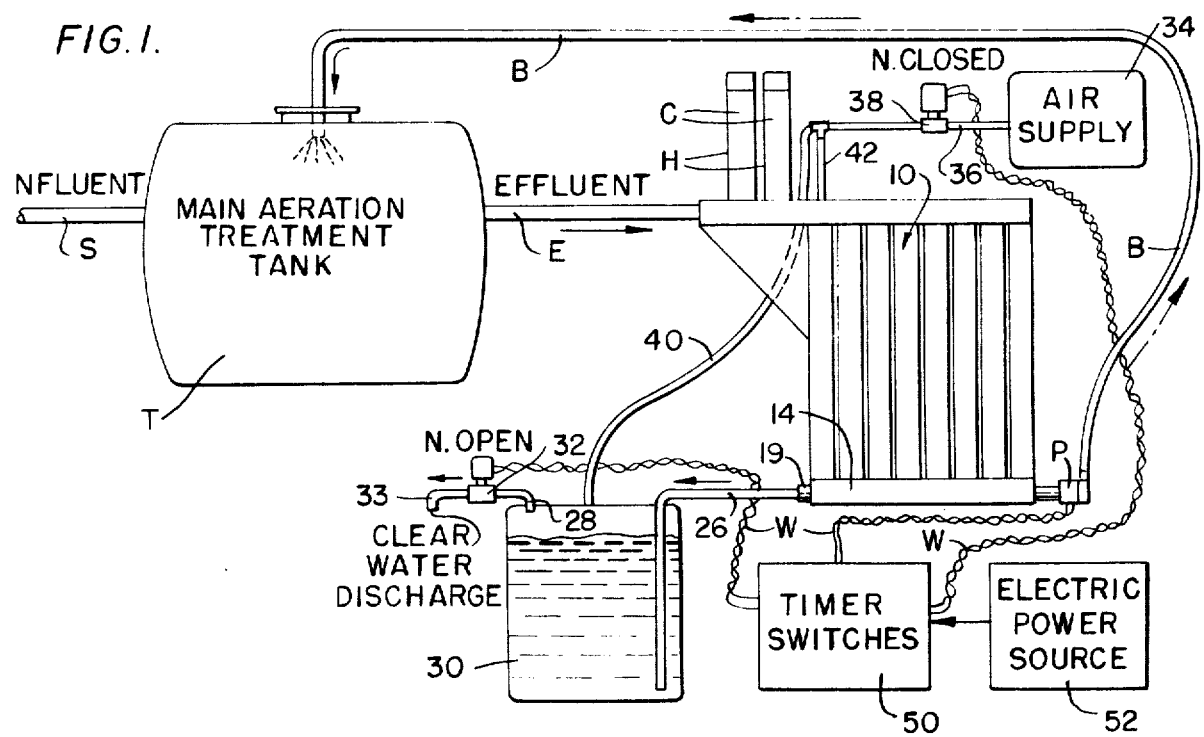
FIG. 1 is a schematic diagram showing a filter system capable of back-flow flushing according to the present invention, and coupled to the output of a main waste water treatment tank.

Referring now to the drawings, FIG. 1 shows an illustrative embodiment, on the right side of which there appears a filter system capable of automatic backflushing at spaced intervals of time, and the filter system being connected to receive the effluent from a waste water treatment tank T, or other waste water treatment unit, the effluent water generally leaving the main treatment unit via pipe E in substantially clarified conditions, and this main unit being followed by a suitable chlorinator C.

Examples of sewage treatment systems which can be used to supply clarified water to the present inventive filter system are included in the aforementioned copending application of Peasley et al, Ser. No. 579,176, now U.S. Pat. No. 3,984,322, and in the aforementioned patent application to Peasley, Ser. No. 641,867 filed Dec. 17, 1975. Any one of a large number of possible systems is schematically represented by the main treatment tank T shown in the present FIG. 1, and connected to a sewage pipe S supplying the influent. The main treatment tank T treats the sewage and delivers substantially clarifed water through its effluent pipe E and into the filter system according to the present invention. A backflush pipe B is so disposed with respect to the main treatment tank T that it can discharge backflush liquid from the filter system according to the present invention, when the filter system is being purged by backflushing as will be hereinafter described in greater detail.

The effluent pipe E feeds into a chlorinator C, which is a purchased off-the shelf chlorinator, comprising one or more vertical housings H containing chlorine crystals. The effluent is passed through these chlorinator housings H and is then discharged into the present filter system 10 shown in elevation in FIG. 1 and shown in greater detail in FIGS. 2, 3, and 4.

Figure 4:
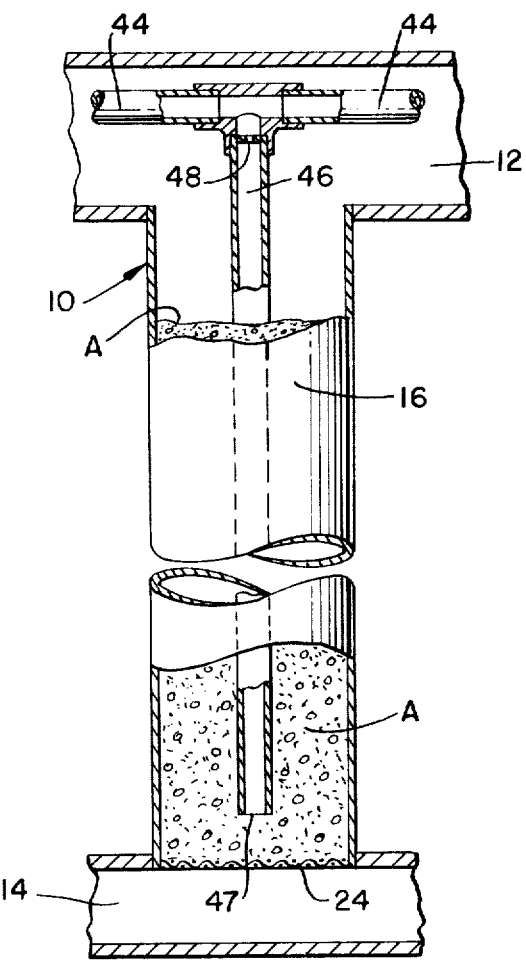
FIG. 4 is a fragmentary enlarged view of one of the vertical filter columns, shown partly in cross-section.
Figure 2:
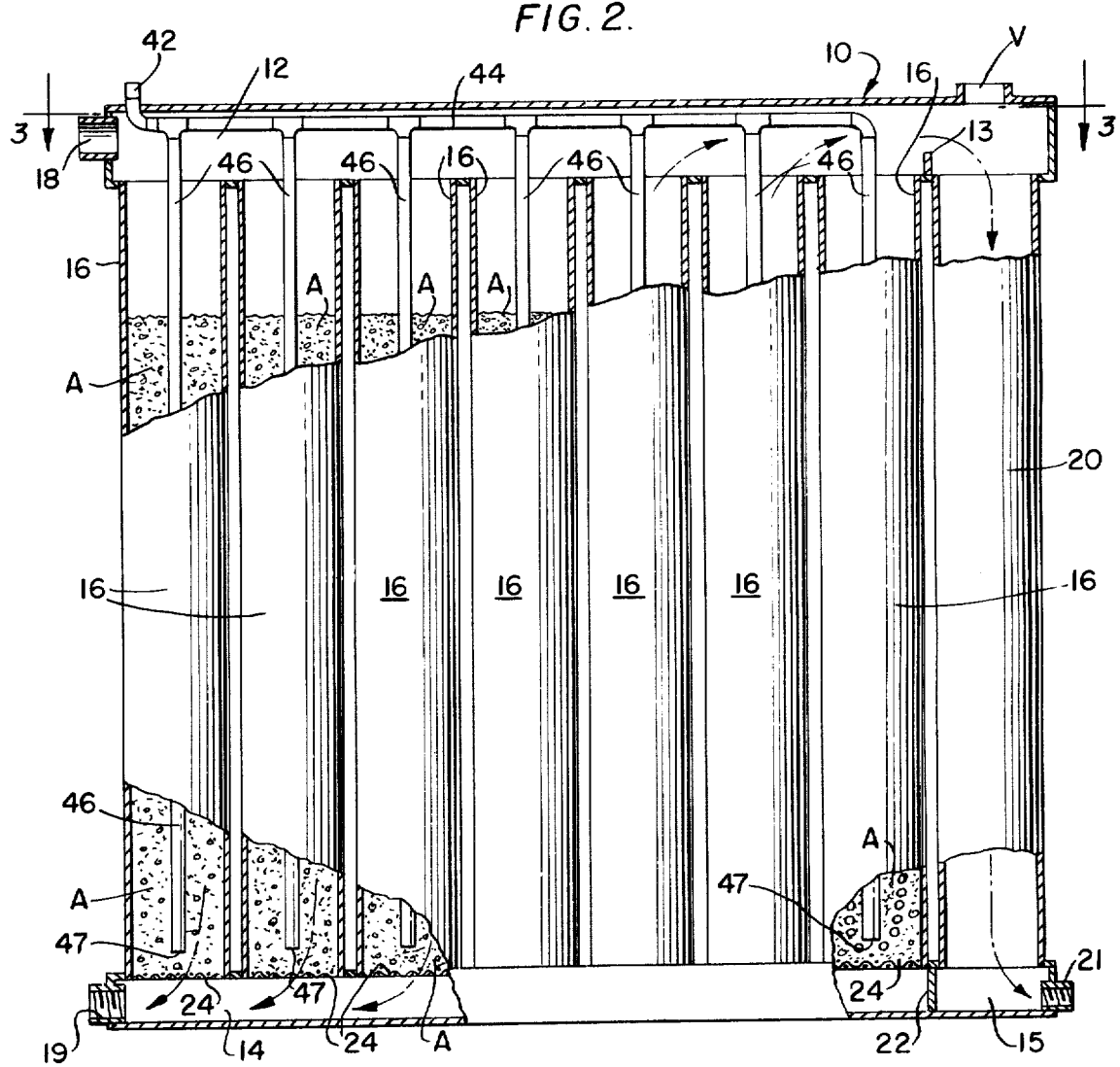
FIG. 2 is a cross-sectional view on an enlarged scale through the aggregate filter portion of the system, the filter being shown on an enlarged scale and partially in cross-section.

As can be seen most clearly in FIGS. 2 and 4, the filter 10 comprises an inlet header 12 and an outlet header 14, and these headers having vertically oriented circular columns 16 as shown in the present illustrative embodiment. The columns are sealed at their upper and lower ends respectively to the adjacent walls of the headers 12 and 14 so that the columns provide the only communication between the upper and lower headers. In the normal course of events, water entering the upper header 12 through the inlet pipe fitting 18 will pass downwardly through the various columns 16 and discharge into the lower header 14, from which the filtered water exits through the exit fitting 19.

Figure 3:
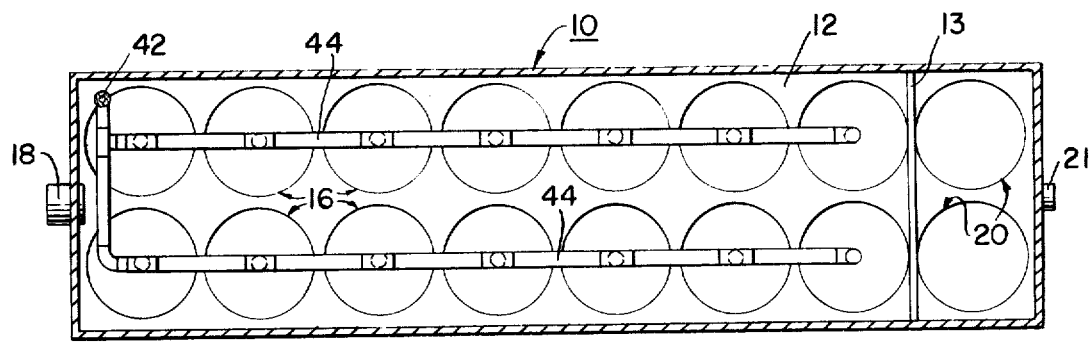
FIG. 3 is a sectional view through the filter taken along line 3—3 of FIG. 2.

At the right side of the filter there are two tubes 20 which are shown best in FIGS. 2 and 3, and which also pass through the adjacent walls of the respective upper header 12 and lower header 14. However, there is a partition 22 extending across the lower header 14 so as to prevent flow of liquid through the tubes 20 from the portion 15 of the lower header into the portion 14 thereof. Instead, any liquid flowing downwardly through the tubes 20 must depart from the filter through the fitting 21 as shown in FIGS. 2 and 3. Within the upper header 12, there is a weir 13 which stands upwardly from the bottom wall of the upper header 12 and extends transversely across the upper header 12 as can be seen in FIG. 3. The weir 13 extends only part-way toward the top of the manifold 12, i.e., no higher than the bottom of the inlet fitting 18. Therefore, water entering through the fitting 18 will tend to depart by flowing downwardly through the filter columns 16 rather than passing over the weir 13 and flowing downwardly through the tubes 20 to escape from the main filter. All of the columns 16 are filled nearly to their tops by aggregate A, this aggregate comprising fine particles, such as sand, pebbles, or other filter medium aggregate, the various types of which are well known in the prior art.

The aggregate A is retained in the columns 16 by the screens 24 on which it rests. It is expected that in the normal course of operation of the device as a filter, the clarified effluent from the main treatment tank T will enter through the pipe E and chlorinator C and through the fitting 18 into the inlet header 12 at the top of the filter assembly. The clarified water will then pass downwardly through the aggregate in the various filter columns 16, and will pass outwardly through the screens 24, through the outlet header 14, and out of the filter via the fitting 19, the filtered water flowing through the pipe 26 into a chlorine contact holding tank 30. When the water has risen in the contact holding tank 30 to the level of its outlet pipe 28, the water will then pass outwardly through the normally open solenoid valve 32 and will be discharged from the discharge pipe 33 as clear chlorinated water. This water will be clean enough to be legally discharged into rivers or streams, or discharged onto the ground without further treatment. The size of the chlorine contact holding tank 30 is determined by the required period of residency of the chlorinated water, generally set by the local government.

Referring to the drawing as shown in FIG. 1, this filter system further includes means for periodically backflushing the filter in order to reduce the tendency thereof to clog and to clean the filter so as to facilitate the flow of effluent therethrough. For this purpose air supply means 34 supplies air through the pipe 36 to a normally closed solenoid valve 38. When the valve opens, air under pressure is supplied through the pipe 40 to pressurize the air space above water level in the chlorine contact holding tank 30. Another branch 42 of the air supply pipe delivers air under pressure through horizontal air distribution pipes 44 which extend horizontally inside the inlet header 12. These pipes 44 are connected to vertically disposed stand pipes 46, one such pipe for each vertical filter column 16. The stand pipes 46 extend downwardly through the centers of the columns 16, and each terminates at a lower end 47 which is disposed somewhat above the screen 24. When the valve 38 is opened, the air supply 34 delivers air under pressure through the pipe 42 and through the pipes 44 and downwardly through the vertical stand pipes 46, where it is discharged at the lower ends 47 into the aggregate A. At the upper end of each stand pipe 46 where it joins a horizontal air distribution pipe 44, there is a restriction 48 whose opening is small as compared with the diameter of the pipe 46, FIG. 4. It is the purpose of the restriction 48 in each stand pipe to throttle the amount of air entering the stand pipe so that the amount of air which is allowed to enter each of the stand pipes 46 will be substantially the same even though the degree of clogging in the various aggregate beds within the filter columns 16 may vary considerably. Thus, the aggregate A in the column 16 which is the least clogged will not receive the greatest flow of air. The upward flow of air as can be seen near the right side of the drawing in FIG. 2 acts as an air lift pump to cause the water and solids within the columns and the air entrained in it to rise through the aggregate A. The air is vented from the upper header 12 by a vent V. This air lift effect is also strongly augmented by the fact that the pipe 40 pressurizes the top of the chlorine contact holding tank 30 thereby driving the clarified water backwardly through the pipe 26 into the lower header 14, thereby causing the water to rise rapidly through the various filter columns 16 to clean the aggregate therein.

At the time when the valve 38 is opened to supply air under pressure to the tank 30 and to the pipes 44, the discharge valve 32 is simultaneously closed so as to prevent the air entering the tank 30 through the pipe 40 from escaping through the pipe 28. At the same time, the electric pump P is also turned on. These three functions are controlled by a timer control 50 driven by a source of electrical power 52. Most of the time the electical wires W leaving the timer 50 are de-energized, and during this time the water discharge valve 32 is normally open, the air valve 38 is normally closed, and the pump P is de-energized. Accordingly, the filter 10 is performing its normal filtering function of filtering the substantially clarified water entering from the pipe E and from the chlorinator C by allowing it to trickle downwardly in the columns 16 through the aggregate A and through the screens 24, departing from the filter through the pipe 26 into the holding tank 30 for subsequent discharge therefrom.

FILTER BACKFLUSHING

When the timer 50 driven by the electric power source 52 reverses its operating mode and enters a purge cycle, it simultaneously energizes the three pairs of wires W so that the water discharge valve 32 is closed, the air valve 38 is opened to pressurize the pipes 40 and 42, and the pump is turned on so as to draw backflush water from the fitting 21 at the bottom of the tubes 20 and discharge the backflush water through the pipe B into the main aeration treatment tank T where the backflush mixes with other sewage being treated therein.

While the pipe 40 is pressurized and the valve 32 is closed, the filtered water within the holding tank 30 is forced downwardly and is backflushed through the pipe 26 into the lower header 14. The backflush water passes upwardly through the screens 24 which are located at the lower ends of all of the filter columns 16, and the water is flushed upwardly through the aggregate A into the upper header 12. The backflush water entering the filter tubes 16 through the screens 24 is aerated by air being carried downwardly in the stand pipes 46 and then outwardly through the lower ends 47 of the stand pipes. This air then bubbles upwardly with the backflush water, travelling upwardly from the lower ends of the filter columns 16 as shown in the last filer tube 16 to the right in FIG. 2. The upwardly bubbling air is allowed to escape from the upper header 14 through the vent V. The combination of air and backflush water tends to dislodge solids within the columns 16 which would otherwise clog the filter aggregate, and causes these solids to be entrained in the backflush water and carried upwardly toward the upper header 12. The water thus backflushed through all of the columns 16 rises in the water header 12 until it overflows the weir 13 and falls into the backflush receiving tubes 20 and passes downwardly therein to exit through the fitting 21 into the pump P. This water with the backflushed solids from the aggregate is pumped by the pump P through the backflush pipe B where it is discharged into the top of the main treatment tank, whereby the backflushed solids from the filter are recycled to be again treated along with the sludge within the tank T. This backflushing and returning of the solids to the main treatment tank T continues for an interval of time set by the timer, perhaps a few minutes, and when the timer reverts to its normal "OFF" condition, thereby de-energizing all of the wires W, the backflushing cycle ends. The water valve 32 at the discharge opens to permit discharge of clear water again through the pipe 33; the air valve 38 returns to its normally closed position to shut off air pressure to the pipes 40 and 42; and the pump P is de-energized.

The filter then resumes normal operation, in the illustrative embodiment, as a tertiary aggregate filter, the water passing into it from the pipe E and the chlorinator C, passing through the upper header 12, but remaining generally to the left of the weir 13. The water passes downwardly through the aggregate A in the filter columns 16 and outwardly through the wire mesh screen 24 into the lower manifold 14 whence it is discharged through the pipe 26 into the chlorine contact holding tank 30 prior to its eventual discharge through the pipe 33. It is to be noted that the weir may be omitted or made lower than is shown in FIG. 2. If omitted, some of the effluent water entering through the pipe E will fill the tubes 20. From the time that the tubes 20 are filled by this water until the next purge cycle when the pump is turned on for backflushing of the filter, the tubes will stay full and inlet water which enters the upper header 12 must pass downwardly through the columns 16. This water cannot depart through the tubes 20, once they have been filled, since the pipe B rises above the level of the header 12. Thus, the weir is helpful, but not entirely necessary to the satisfactory operation of the present system.

It is to be noted that my aforementioned patent application 641,867 contains electrical timer means for purging the main sewage treatment filters on a periodic basis, for instance, once a day or once a week. There is no reason why the same purge timer which times the backflushing of the treatment system T shown in Ser. No. 641,867 could not also control the valves 32 and 38 and the pump P. Thus, the main system purge timer can be used in place of the timer 50 and the electrical power source 52, in cases where the present filter system is added to a main treatment system T of a type having a periodic electrical timer associated therewith.

The present invention is not to be limited to the exact embodiments set forth in the drawings, for obviously changes may be made therein within the scope of the following claims.

I claim:

1. A filter system to be backflushed during a purge cycle, the filter system being coupled to receive substantially clarified water from a main treatment unit, said system comprising:
    a. multiple upright filter columns, each column being tall and narrow and having an upper end and a lower end and each column being substantially filled with filter aggregate;
    b. upper header means communicating with the upper ends of said filter columns, and having an inlet connected to receive said substantially clarified water;
    c. lower header means communicating with the lower ends of said filter columns and having an outlet to discharge the filtered water from the columns;
    d. backflush receiving tube means communicating with the upper header means and coupled to means operative to discharge into said main treatment unit during a purge cycle;
    e. means for introducing compressed air during purge cycles into the filter aggregate comprising a stand pipe entering each filter column from above the upper end thereof and extending through the aggregate and having an opening substantially at the lower end of each column, pipe means connecting the upper ends of the stand pipes to a source of compressed air, and valve means connected in said pipe means and operative during purge cycles to admit compressed air into the stand pipes;
    f. means for backflushing filtered water upwardly in the columns from the lower header means during purge cycles simultaneously with said introduction of compressed air and the upward flow thereof from the opening in each stand pipe; and
    g. control means for initiating said purge cycles and opening said valve means.

2. In a filter system as set forth in claim 1, restriction means in each stand pipe for restricting it to an opening which is small as compared with the diameter of the stand pipe, and the restriction means in each stand pipe being located at a level above which water rises in the stand pipe.

3. In a filter system as set forth in claim 1, screen means across the lower end of each filter column below the lower end of the stand pipe, and said aggregate resting on the screen means.

4. In a filter system as set forth in claim 1, said backflush receiving tube means communicating with said upper header at a level which is above the level of the upper ends of the filter columns, and below the level of the inlet to the upper header.

5. In a filter system as set forth in claim 1, said backflush receiving tube means communicating with said upper header across the top of a weir disposed between said receiving tube means on the one side and said inlet and filter columns on the other side.

6. In a filter system as set forth in claim 1, said means operative to discharge into said main treatment unit comprising a pump coupled to said receiving tube means and connected to discharge into said main system, and operative during purge cycles.

7. In a filter system as set forth in claim 1, a chlorinator connected in series between said main treatment unit and said inlet to the upper header means and operative to chlorinate said clarified water; and a chlorine contact holding tank coupled with the outlet of the lower header means to receive the filtered water.

8. In a filter system as set forth in claim 7, said chlorine contact tank being closed except for an inlet pipe connected with the lower header means and a water discharge outlet; and said means for backflushing water comprising means for closing the water discharge outlet and pressurizing the tank with compressed air to drive water from the tank back into said lower header means during purge cycles.

9. In a filter system as set forth in claim 7, said chlorine contact tank being enclosed and having an inlet pipe extending to the bottom of the tank and connected to the outlet of said lower header means, and having a water discharge outlet with valve means for closing said outlet; said means for backflushing water including means to pressurize the tank with compressed air, and said purge cycle control means being operative to close said outlet valve means and to energize said means to pressurize the tank and to energize said means for introducing compressed air into the filter aggregate during purge cycles.

* * * * *